US006881172B2

United States Patent
Huelser et al.

(10) Patent No.: US 6,881,172 B2
(45) Date of Patent: Apr. 19, 2005

(54) METHOD AND ARRANGEMENT FOR AUTOMATICALLY RESTARTING A DRIVE UNIT

(75) Inventors: Holger Huelser, Graz (AT); Frank Bickendorf, Ditzingen (DE); Thorsten Juenemann, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/359,724

(22) Filed: Feb. 7, 2003

(65) Prior Publication Data

US 2003/0153430 A1 Aug. 14, 2003

(30) Foreign Application Priority Data

Feb. 7, 2002 (DE) .......................... 102 05 020

(51) Int. Cl.[7] .............................. B60K 41/02
(52) U.S. Cl. ...................... 477/83; 477/90; 477/91; 477/167; 477/181; 123/179.3; 123/179.4; 701/113
(58) Field of Search ...................... 477/83, 90, 91, 477/167, 181; 701/113; 123/179.3, 179.4; 307/10.6

(56) References Cited

U.S. PATENT DOCUMENTS

| 4,192,279 | A | * | 3/1980 | Maisch et al. | ............ 123/198 F |
| 4,362,133 | A | * | 12/1982 | Malik | .......................... 477/99 |
| 5,188,070 | A | * | 2/1993 | Otsuka et al. | ................ 477/99 |
| 6,352,489 | B1 | * | 3/2002 | Kuroda et al. | ................. 477/5 |
| 6,371,889 | B1 | * | 4/2002 | Kuroda et al. | .............. 477/181 |
| 2003/0041830 | A1 | * | 3/2003 | Sugiura et al. | .......... 123/179.4 |
| 2003/0089326 | A1 | * | 5/2003 | Ujifusa | .................... 123/179.4 |

* cited by examiner

Primary Examiner—Roger Pang
Assistant Examiner—David D. Le
(74) Attorney, Agent, or Firm—Walter Ottesen

(57) ABSTRACT

A method and an arrangement automatically restarts a drive unit (1) when there is an unintended stalling of the drive unit (1). In the case of stalling, checks are made as to whether the drive unit (1) was already in a steady-state condition directly before the stalling, as to whether the stalling took place because of an operator input, especially at an input unit (5) and as to whether a force-tight connection between the drive unit (1) and a transmission (25 or 80) is present. A restart of the drive unit (1) is automatically initiated when: the drive unit (1) was already in a steady-state condition directly before the stalling; when the stalling took place in a departure from the operator input; and, when the force-tight connection between the transmission (25 or 80) and the drive unit (1) is interrupted.

14 Claims, 3 Drawing Sheets

METHOD AND ARRANGEMENT FOR AUTOMATICALLY RESTARTING A DRIVE UNIT

FIELD OF THE INVENTION

The invention relates to a method and an arrangement for automatically restarting a drive unit including an internal combustion engine of a motor vehicle.

BACKGROUND OF THE INVENTION

In motor vehicles having internal combustion engines, in some cases an unwanted stop of the engine occurs, the so-called stalling, often because of a faulty command of the driver. This situation can occur, for example, when the clutch pedal is released too fast.

Such situations are perceived by the driver as being very unpleasant and often lead to further faulty commands because of the hectic situation associated therewith. Modern-day vehicles require a renewed start of the engine by rotating the ignition key. Often, a back-rotation of the ignition key is necessary before the engine can be started again by a new rotation of the ignition key in the opposite direction.

SUMMARY OF THE INVENTION

The method and arrangement of the invention afford the advantage with respect to the foregoing that a check is made in the event of a stalling of the drive unit as to whether: the drive unit was already in a steady-state condition directly in advance of the stalling; the stalling of the drive unit took place because of a user input especially at an input unit; a force-tight connection is present between the drive unit and the transmission; and, that a restart of the drive unit is automatically initiated when the drive unit was already in a steady-state condition directly in advance of the stalling when the stalling took place in a departure from the user input and when the transmission is separated from the drive unit so that there is no force-tight engagement. In this way, the drive unit can be automatically restarted without any action by the user after the drive unit stopped unintentionally, for example, by stalling. Especially with the configuration of the drive unit as an internal combustion engine of a motor vehicle, the driver of the vehicle can much more rapidly leave the situation of the unwanted standstill with a stalled engine without an actuation of the ignition key being necessary. This situation is often very unpleasant for the driver.

It is advantageous when it is additionally checked whether the drive unit still outputs a torque and that the restart is only initiated for a standstill of the drive unit. In this way, a starter motor of the drive unit is protected against excessive wear.

A further advantage results when a check is made as to whether a clutch element is actuated for separating the force-tight connection of the drive unit from the transmission or an operator-controlled element is actuated for adjusting a torque of the drive unit or whether a neutral position is set with an automatic transmission and the restart is initiated only in this case. In this way, the explicit desire of the user for a restart can be detected and thereby a restart is prevented in opposition to the user's desire. It is furthermore advantageous when the departure of the stalling of the drive unit from the operator's input is determined in dependence upon the course of the rpm of the drive unit and in dependence upon the actuation of the clutch element or of the operator-controlled element. In this way, based on the driver performance, a check is made when there is an engine stalling as to whether the stalling of the engine indeed took place in opposition to the user's input. A restart not wanted by the operator can thereby reliably be prevented.

A further advantage results when, in the case wherein the stop of the drive unit departs from the operator input, a force-tight connection, which is still present between the drive unit and the transmission, is automatically separated. In this way, the restart takes place fully automatically and the operator must not, for example, separate the force-tight connection between the drive unit and the transmission, for example, by actuating the clutch element. This defines an especially comfortable realization of the restart for the operator after a stalling for which no action at all is required from the operator and, in the case of the configuration of the drive unit as an internal combustion engine of a motor vehicle, the unwanted standstill with a stalled engine can be left much more rapidly. Hectic situations and further faulty commands of the operator in such situations are thereby substantially precluded.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
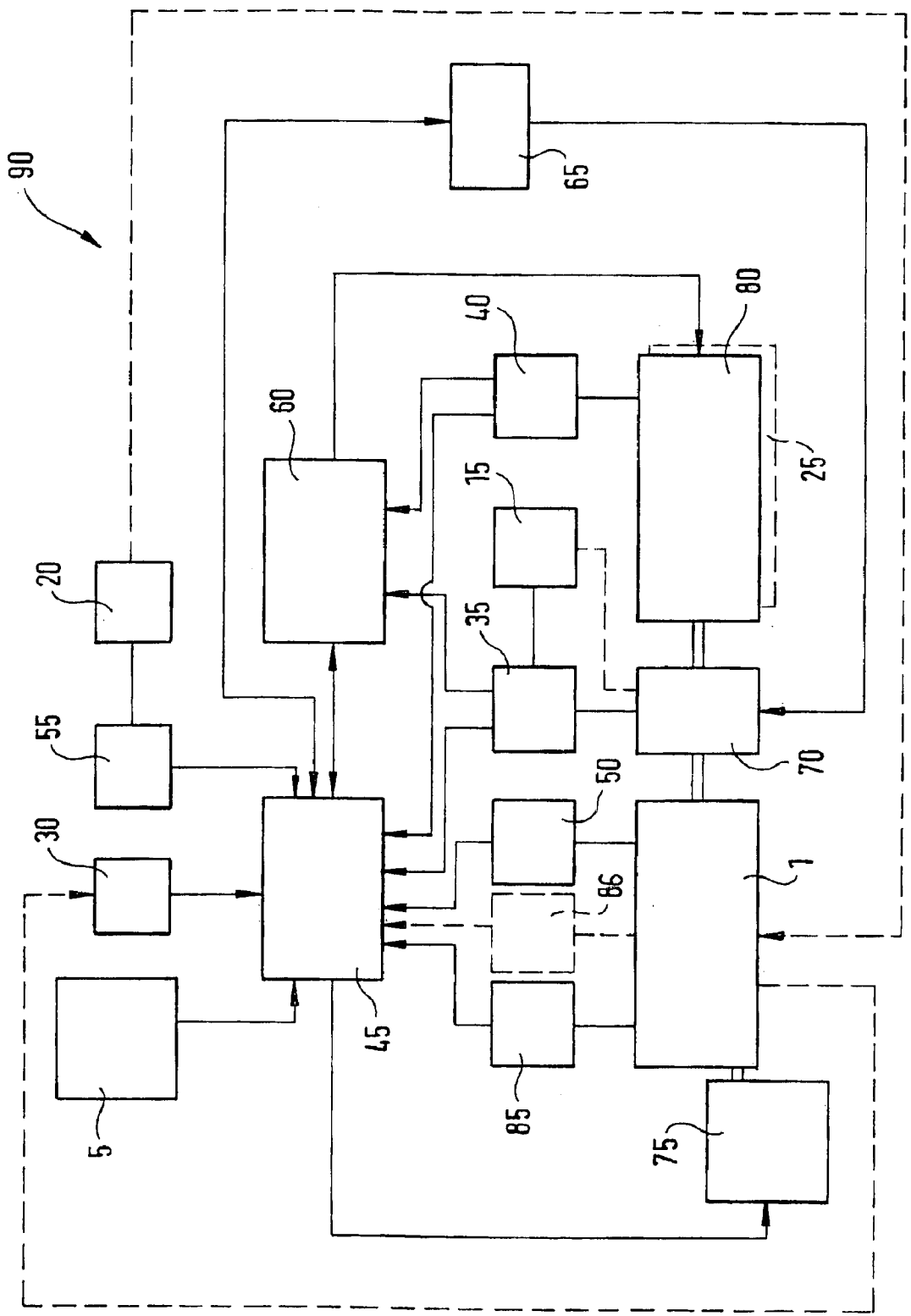
FIG. 1 is a block circuit diagram of an arrangement of the invention for automatically restarting a drive unit.

In FIG. 1, reference numeral 90 identifies an arrangement for automatically restarting a drive unit 1, which is configured as an internal combustion engine of a motor vehicle in this embodiment. Furthermore, a manual transmission 80 having several gear stages is provided or alternatively, an automatic transmission 25 having several gear stages. The manual transmission 80 and the automatic transmission 25 each permit the setting of a state "neutral position" wherein no torque can be transmitted via the transmissions 80 or 25. An element 70 is mounted between the engine 1 and the transmission (80, 25) which permits a slipping force-tight connection or a complete separation between the engine 1 and the particular transmission (25 or 80). The element 70 can, for example, be configured as a clutch or a hydrodynamic converter. Furthermore, a starter 75 is provided which can start the engine 1. Control means 45 are shown, which, in the following, are configured as a first electronic control apparatus by way of example. The starter 75 is driven in accordance with the invention by the control means 45 in such a manner that it starts the engine 1 without further actions by the driver, at least at the ignition switch.

Furthermore, an input unit 5 is provided, which is connected to the first electronic control apparatus 45. Via the input unit 5, the driver can fix which degree of operational readiness is wanted from the vehicle. Via the input unit 5, the driver can especially determine whether only a limited operational readiness of the vehicle is wanted, which, for example, would still permit the operation of the radio or other small consumers but not at a start-to-travel of the vehicle, or whether the driver wants complete operational readiness, which includes also the start-to-travel of the vehicle. The input unit 5 can be configured in any desired manner, for example, in the form of a keypad or as an ignition switch as is conventional in present-day vehicles. The ignition switch is operable by means of an ignition key. The input unit 5 is connected to the first electronic control apparatus 45 so that data can be transmitted.

As a further transducer for detecting the driver command, the signals of a first sensor 35 on a clutch actuating element 15 and/or of a sensor 55 on an operator-controlled element 20 can be evaluated by the first electronic control apparatus 45. The first sensor 35 operates in the following as a second detecting means or as a fourth detecting means and the second sensor 55 operates in the following as a fifth detecting means. The signals of the first sensor 35 are also directly supplied to a second electronic control apparatus 60. The signals of the second sensor 55 are supplied via the first electronic control apparatus 45 to the second electronic control apparatus 60 via a connection between the first electronic control apparatus 45 and the second electronic control apparatus 60.

An actuation of the clutch actuating element 15 functions to separate or to provide a force-tight connection between the engine 1 and the manual transmission 80 by means of the element 70, which is here configured, for example, as a clutch. The first sensor 35 can detect the state of the clutch 70 or the state of the clutch actuating element 15 which, for example, is configured as a clutch pedal, and transmit to the first electronic control apparatus 45. The state of the clutch 70 is characterized by the separation of the connection between the engine 1 and the manual transmission 80 or by a force-tight connection between the engine 1 and the manual transmission 80. The degree of actuation of the clutch pedal 15 can be detected by the first sensor 35 as a state of this clutch pedal.

The operator-controlled element 20 is actuated for adjusting a torque at the engine 1 and is, for example, configured as an accelerator pedal of the vehicle.

Furthermore, a third sensor 40 is provided which, in the following, is characterized as a second detecting means or sixth detecting means and detects a state of the particular transmission (25 or 80) and transmits this state to the first electronic control apparatus and to the second electronic control apparatus 60. Such a state can, for example, correspond to the gear stage just set or to the state "neutral position" of the particular transmission (25 or 80). The particular transmission (25 or 80) is driven by the second electronic control apparatus 60. In the case of the automatic transmission 25, this drive functions to set a gear stage or to adjust the state "neutral position" wherein no torque can be transmitted via the automatic transmission 25. The second electronic control apparatus 60 is referred to in the following as a first separating means because its function comprises also separating a force-tight connection between the engine 1 and the automatic transmission 25 by adjusting the state "neutral position".

Furthermore, second separation means 65 are provided which, on the one hand, are connected to the first electronic control apparatus 45 and, on the other hand, to the clutch 70. In the case of the manual transmission 80, the second separation means 65 function to separate a force-tight connection between the engine 1 and the manual transmission 80 via a suitable drive of the clutch 70.

Furthermore, first detecting means 30 are provided which function to detect a steady-state condition of the engine 1 and, for example, to detect its rpm. The first detecting means 30 are connected to the first electronic control apparatus 45 and conduct the detected rpm to the first electronic control apparatus 45.

Furthermore, third detecting means 50 are provided which are identified in the following as seventh detecting means and function to detect a torque of the engine 1. Insofar as the first detecting means 30 is to detect the rpm of the engine 1, the first detecting means 30 and the third detecting means 50 can also be combined. Furthermore, the third detecting means 50 can also fulfill the function of the seventh detecting means, which are provided for detecting a course of an rpm of the engine 1. The third detecting means 50 as also the first detecting means 30 are, on the one hand, connected to the engine 1 and, on the other hand, to the first electronic control apparatus 45.

Furthermore, a temperature sensor 85 can be provided which, on the one hand, is connected to the engine 1 and, on the other hand, to the first electronic control apparatus 45 and functions to detect a temperature of the engine 1 and to advise the first electronic control apparatus 45.

The input unit 5 is also connected to the first electronic control apparatus 45.

The method of the invention which runs in the first electronic control apparatus 45 is described below. The first electronic control apparatus 45 can, for example, be the engine control apparatus of the vehicle. Alternatively, the method of the invention can also run in the second electronic control apparatus 60 which usually functions to drive the particular transmission (25 or 80) and, if required, also the clutch 70. The method of the invention can run, however, also in an electronic control apparatus which drives the clutch 70 or in any further desired electronic control apparatus provided for this purpose. In the following, it is assumed by way of example, that the method of the invention runs in the first electronic control apparatus 45. The sequence of the method of the invention is described with respect to the flowchart of FIG. 2.

The method of the invention also corresponds to the situation wherein the functions of the first control apparatus 45 and of the second control apparatus 60 are realized in a single apparatus. First, the first electronic control apparatus 45 checks at program point 100 as to whether the engine 1 stalls. If this is the case, then the program branches to program point 105, otherwise, there is a movement out of the program. The check as to the engine 1 stalling takes place with the aid of the seventh detecting means, which can be combined with the third detecting means 50 as in FIG. 1, but can also be mounted separately from the detecting means 50 and, on the one hand, be connected to the engine 1 and, on the other hand, to the first electronic control apparatus 45 as shown by broken lines in FIG. 1 and by using reference numeral 86 for the seventh detecting means. When the engine 1 stalls, the rpm of the engine drops off to zero. If such a course of the rpm of the engine 1 is transmitted to the first electronic control apparatus 45 by the seventh detecting means 86, then the first electronic control apparatus 45 recognizes the stalling of the engine 1.

At program point 105, the first electronic control apparatus 45 checks whether the engine 1 was already in a steady-state condition directly ahead of the stalling thereof; that is, whether the engine 1 was running before stalling. For this purpose, when starting the engine 1, a check is made by the first detecting means 30 as to whether the rpm of the engine 1 has exceeded a pregiven threshold value of, for example, 600 revolutions per minute. If this is the case, then, an initialization variable is set in the first electronic control apparatus 45 which indicates that the engine 1 was already in the steady-state condition, that is, that it was already running. Alternatively, it can be provided that the first electronic control apparatus 45 receives the information as to the rpm of the engine 1 from a separate engine control apparatus via a data connection. In lieu of the rpm of the engine 1, also other information can be transmitted via this data connection which indicates whether the engine 1 is at steady state. In the simplest state, this information can be a data byte which is set by the engine control apparatus when the engine 1 is at steady state. The engine control apparatus can, for example, determine whether the engine 1 is at steady state utilizing the first detecting means 30, for example, in the manner described.

If the first electronic control apparatus 45 determines at program point 105 that the engine 1 was already in a steady-state condition directly in advance of stalling, then there is a branching to program point 110, otherwise, there is a movement out of the program. At program point 110, the first electronic control apparatus 45 checks whether the engine 1 has stopped running against the will of the driver. If this is the case, then there is a branching to program point 115, otherwise, there is a movement out of the program. The check as to whether the engine 1 stopped running against the will of the driver can, for example, take place in that signals of the input unit 5 and the seventh detecting means 86 are evaluated. If it is determined in the first electronic control apparatus 45 that the rpm of the engine 1 drops to zero, that is, that the engine 1 stalls even though an operation of the engine 1 in its steady state was inputted at the input unit 5 by the user, for example, in that the driver has inputted full operational readiness of the vehicle at the ignition switch via the ignition key, then the first electronic control apparatus 45 detects that the engine 1 has come to standstill against the will of the driver.

In addition, or alternatively, the signals of the seventh detecting means 86 as to the course of the rpm of the engine 1 together with the signals of the first sensor 35 at the clutch 70 or at the clutch element 15 and/or together with the signals of the second sensor 55 at the accelerator pedal can be applied for checking as to whether the engine 1 has come to standstill or stalled against the will of the driver. If the rpm of the engine 1 drops to zero and the clutch pedal 15 for separating the engine 1 from the manual transmission 80 is actuated via the clutch 70, then the first electronic control apparatus 45 recognizes that the stalling of the engine 1 took place against the will of the driver. The separation of the force-tight connection between the engine 1 and the manual transmission 80 via the actuation of the clutch pedal 15 is the usual reaction of a driver in order to prevent the stalling of the engine 1.

A further indication for a stalling of the engine 1 against the will of the driver can be derived from the fact that the accelerator pedal 20 is actuated for increasing or maintaining the rpm of the engine 1 and the rpm nonetheless drops to zero.

At program point 115, the first electronic control apparatus 45 checks whether the conditions for an automatic restart of the engine 1 are satisfied. If this is the case, then there is a branching to a program point 120, otherwise, there is a branching back to program point 110. What is essential for the check at program point 115 is for the first electronic control apparatus 45 to check whether a force-tight connection is present between the engine 1 and the particular transmission (25 or 80). If such a force-tight connection is not presents that is, the particular transmission (25 or 80) is separated from the engine, then there is a branching to program point 120, otherwise, there is a branching back to program point 110. When a force-tight connection is present between the engine 1 and the particular transmission (25 or 80), then there is also a force-tight connection between the engine 1 and the drive wheels of the vehicle. Otherwise, the engine 1 is separated from the drive wheels. The first electronic control apparatus 45 can determine via the first sensor 35 whether a force-tight connection is present via the clutch 70 between the engine 1 and the particular transmission (25 or 80). In this case, the first sensor 35 defines the second detecting means.

Additionally or alternatively, the check as to a force-tight connection between the engine 1 and the automatic transmission 25 can take place via the third sensor 40, which checks whether the automatic transmission 25 is in the neutral position and therefore the drive wheels are likewise separated from the engine 1. In this case, the third sensor likewise defines the second detecting means whose task is generally to detect a force-tight connection between the engine 1 and the drive wheels. The third sensor can also detect a position of a selection lever of the automatic transmission 25 and check whether the selection lever is in a position corresponding to the neutral position of the automatic transmission 25.

Alternatively, it can be provided that the information as to the state of the automatic transmission 25 (which can also be configured as an automated shift transmission) is known to the second electronic control unit 60 and, from there, the information as to the state of the automatic transmission 25 (for example, as to a set neutral position) is transmitted to the first control apparatus 45. In this case, the second electronic control apparatus 60 assumes the function of the second detecting means. If the clutch 70 is automated and is driven by an additional control apparatus (not shown in FIG. 1), then, alternatively, it can be provided to transmit the information as to the clutch position to the first electronic control apparatus 45 from this additional control apparatus. The clutch position then indicates whether the engine 1 is connected force tight to the particular transmission (25 or 80).

In order to now initiate an automatic restart fully automatically, that is, without any operator activity, it can be provided that an existing force-tight connection between the engine 1 and the drive wheels is interrupted after program point 110 and before program point 115. For this purpose, and in the case of an automatic transmission 25, the first electronic control apparatus 45 causes the second electronic control apparatus 60 to adjust the neutral position of the automatic transmission 25. In the case of use of the manual transmission 80, the first electronic control apparatus 45 can cause the second separating means 65 to open the clutch 70 and, in this way, interrupt the force-tight connection between the engine 1 and the manual transmission 80. The second separation means 65 can assume the function of a control apparatus for the clutch 70. The clutch 70 can then advantageously be configured as an automated clutch. This function of the control apparatus is described above.

Optionally, additional conditions can be checked at program point 115. If these conditions are satisfied, there is a branching to program point 120 and, if these conditions are not satisfied, a branching back takes place to program point 110. Accordingly, and for safety reasons and for protecting the starter 75 against unnecessary wear, it can be provided to inhibit the automatic restart as long as the engine 1 rotates. For this purpose, information as to the rpm of the engine 1 can be evaluated in the first electronic control apparatus 45.

This information can, for example, come from the third detecting means 50, which are provided for detecting the torque of the engine 1. Alternatively, this information can be supplied from an additional control apparatus (not shown in FIG. 1) via a data connection to the first electronic control apparatus 45. The third detecting means 50 can then be connected to this additional control apparatus.

Furthermore, as an option, a check can be made at program point 115 by the first electronic control apparatus 45 as to whether the driver has inputted the full or only a limited operational readiness for the vehicle at the input unit 5. Full operational readiness means especially the operation of the engine 1 in the steady-state condition; stated otherwise, the engine runs. Limited operational readiness means, for example, the operation of the radio or other small consumers in the vehicle via the battery while the engine 1 is, at the same time, at standstill. The automatic restart should only take place when the driver has pregiven the full operational readiness of the vehicle via the input unit 5, that is, an operation of the engine 1 in the steady-state condition.

Furthermore, and as an option, a check can be made in the first electronic control apparatus 45 at program point 115 as to whether the explicit desire of the driver for a restart was recognized based on the evaluation and only in this case is there a branching to program point 120, otherwise, there is a branching back to program point 110. The first sensor 35 can, for example, detect an actuation of the clutch element 15 or the clutch pedal 15 for separating the force-tight connection between the engine 1 and the manual transmission 80 and transmit this information to the first electronic control apparatus 45. In this case, the first sensor 35 operates in the form of fourth detecting means. If the first electronic control apparatus 45 determines, based on the information of the fourth detecting means 35, that the clutch actuating element 15 was actuated for interrupting the force-tight connection between the engine 1 and the manual transmission 80 (or the clutch 70 was released and therefore the connection between the engine 1 and the manual transmission 80 was interrupted), then the first electronic control apparatus 45 detects the explicit driver command for a restart and branches to program point 120, otherwise the program branches back to program point 110.

In the case of the use of the automatic transmission 25, a detection can be made by means of the third sensor 40 as to whether the neutral position was set at the automatic transmission 25 and this information is transmitted to the first electronic control apparatus 45. The third sensor 40 then operates in the form of a sixth detecting means. This neutral position can be detected also by the sixth detecting means 40 because of the position of the selection lever of the automatic transmission 25. When this first electronic control apparatus 45 detects, on the basis of the information of the sixth detecting means 40, that the neutral position was set on the automatic transmission 25, then the first electronic control apparatus 45 likewise recognizes the explicit desire of the driver for a restart and branches only in this case to program point 120. Otherwise, the program branches back to program point 110.

Additionally or alternatively, it can be provided that the second sensor 55, in the form of fifth detecting means for detecting the actuation of the accelerator pedal 20, outputs information to the first electronic control apparatus 45 and can advise whether the accelerator pedal 20 is actuated for adjusting a torque of the engine 1. The explicit command of the driver for a restart is then recognized by the first electronic control apparatus 45 in that the fifth detecting means 55 advises the first electronic control apparatus 45 that the accelerator pedal 20 is actuated. Only in this case is there a branching to program point 120. Otherwise, there is a branching back to program point 110.

At program point 120, the first electronic control apparatus 45 causes the starter 75 to automatically restart the engine 1. Thereafter, there is a branching to program point 125. At program point 125, the first electronic control apparatus 45 checks whether the restart of the engine 1 is ended. If this is the case, then there is a branching to program point 130, otherwise, there is a branching back to program point 125.

In order to end the automatic restart, the first electronic control apparatus 45 drives the starter 75 so that the engine 1 is no longer started. The automatic restart is to be ended when one of the following conditions is satisfied:

Condition 1

The first control apparatus 45 receives, via the third detecting means 50 for detecting a torque of the engine 1 or via a data connection to the engine control apparatus (not shown in FIG. 1), the information that the rpm of the engine 1 is greater than the pregiven threshold value. This threshold value lies, as described, at an rpm of 600 revolutions per minute, for example. In a further advantageous configuration, it can be provided to make this pregiven threshold value also dependent upon the temperature of the engine 1. For this purpose, it can be provided that the first electronic control apparatus 45 is in data connection with the temperature sensor 85, which detects the temperature of the engine 1. Here it can be provided that the pregiven threshold is to be set lower at higher temperatures of the engine than at lower temperatures.

Condition 2

The automatic restart can also be ended when the first electronic control apparatus 45 receives the information that a force-tight connection between the engine 1 and the particular transmission (25 or 80) is again present and therefore the connection is also present to the drive wheels. The first electronic control apparatus 45 can receive this information via the first sensor 35 or via the third sensor 40 or via a data connection to the second electronic control apparatus 60 or via a data connection to the second separation means 65 insofar as the second separation means 65 is configured as a control apparatus for the clutch 70.

Condition 3

The automatic restart can also be ended when the first electronic control apparatus 45 drives the starter 75 since a time which is greater than a pregiven time threshold. It is especially advantageous when this pregiven time threshold is dependent upon the temperature of the engine 1 which is measured by the temperature sensor 85. The pregiven time threshold can, for example, be selected that much greater the lower the temperature of the engine 1.

Condition 4

The automatic restart can also be ended when the driver inputs a limited operational readiness of the vehicle via the input unit 5 in which a start traveling of the vehicle and therefore a steady-state condition of the engine 1 is not to be realized.

At program point 130, the first electronic control apparatus 45 causes the starter 75 to end the restart. Thereafter, there is a movement out of the program.

Figure 2:
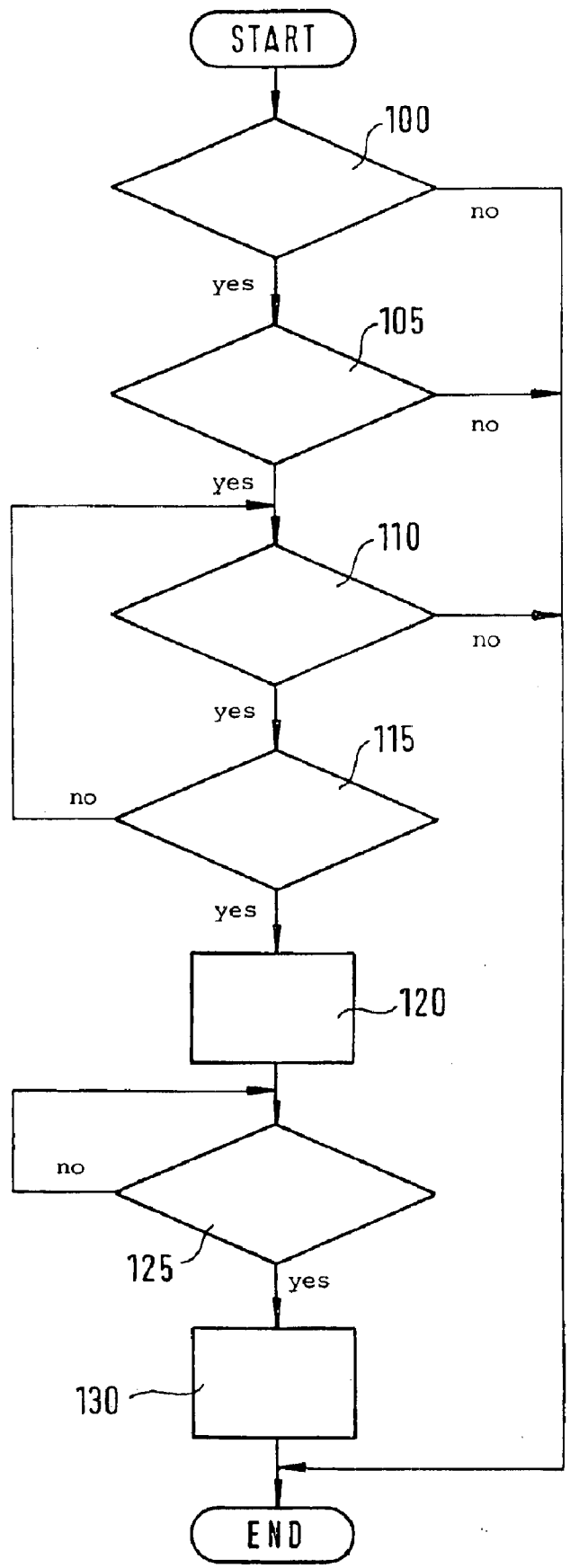
FIG. 2 is a flowchart showing the sequence of a method of the invention for automatically restarting a drive unit; and, FIG. 3 is a state transition diagram for the states of the drive unit occurring in the method and arrangement of the invention.
Figure 3:
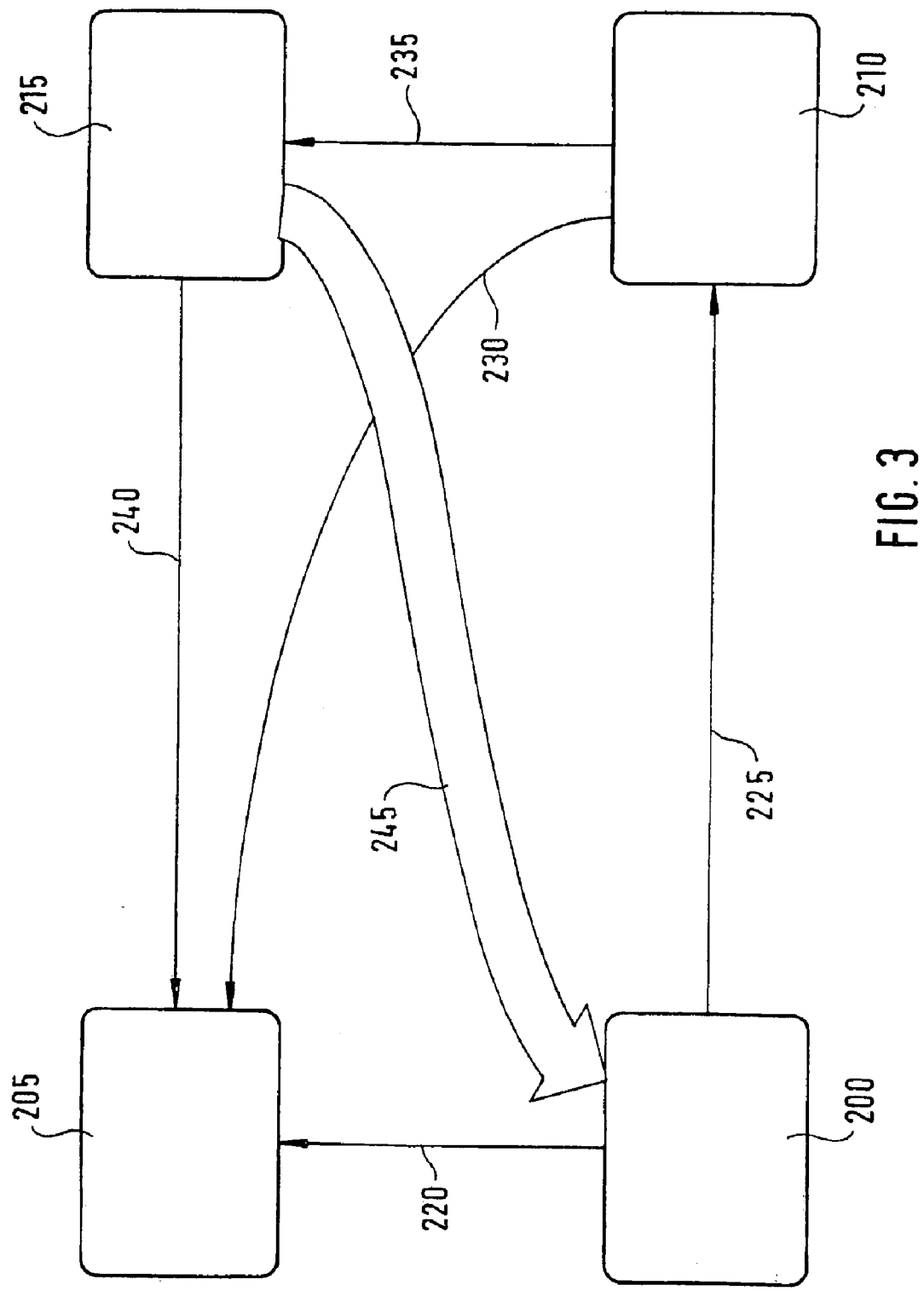

In FIG. 3, a state transition diagram for the various realizable states of the engine 1 is shown. A first state 200 of the engine 1 defines the start of the engine 1. There is a movement out of the first state 200 when a start interruption takes place, for example, when none of the conditions mentioned for the end of the automatic restart is satisfied. In this case, a second state 205 is reached which is characterized by the standstill of the engine 1. The transition from the first state 200 into the second state 205 is identified by reference numeral 220. There is a movement out of the first state 200 also when the engine 1 is at steady state, that is, when it runs. This is the case when at least one of the conditions is satisfied which was previously mentioned for the end of the automatic restart. In this case, a transition 225 to a third state 210 takes place, which is characterized in that the engine 1 runs, that is, it is in its steady-state condition. There can be a movement from the third state 210 to the second state 205 when no input at the input unit 5 is detected in accordance with which the driver inputs a limited operational readiness for which the engine 1 should not run, instead, the radio or other small consumers are to be operated by the battery of the vehicle. The transition from the third state 210 to the second state 205 is identified by reference numeral 230. There can be a movement out of the third state 210 also when the stalling of the engine 1 is detected and simultaneously the input of the driver for a complete operational readiness is present at the input unit 5, that is, for an engine 1 running at steady state. In this case, a fourth state 215 is reached, which is characterized as the unwanted standstill of the engine 1. The state transition from the third state 210 to the fourth state 215 is identified by reference numeral 235. A transition from the fourth state 215 to the second state 205 in accordance with reference numeral 240 takes place as soon as the input for a limited operational readiness of the vehicle is present from the driver at the input unit 5. A transition from the fourth state 215 to the first state 200 takes place in accordance with reference numeral 245 when the condition, which is described at program point 115 according to FIG. 2, is satisfied for the automatic restart or the described conditions for the automatic restart are satisfied.

The conditions for the state transitions are carried out in the manner described in the first electronic control apparatus 45 and the starter 75 is driven by the first electronic control apparatus 45 especially when there is a start interruption in accordance with the state transition 220 and the automatic restart according to state transition 245. With state transition 225, the first electronic control apparatus 45 causes the starter 75 to likewise end the start operation because the engine 1 is at steady state. In state transition 230, the first electronic control apparatus 45 causes a stalling of the engine 1. For this purpose, the first electronic control apparatus 45 can correspondingly drive the motor control apparatus (not shown) which is connected to the engine 1.

It is understood that the foregoing description is that of the preferred embodiments of the invention and that various changes and modifications may be made thereto without departing from the spirit and scope of the invention as defined in the appended claims.

What is claimed is:

1. A method for automatically restarting a drive unit including an internal combustion engine for a motor vehicle, the method comprising the steps of:

in the event of a stalling of said drive unit, checking whether said drive unit was in a steady-state condition directly before said stalling;

checking whether said stalling of said drive unit took place because of an input by the operator;

checking whether a force-tight connection is present between said drive unit and a transmission;

automatically initiating a restart of said drive unit when: said drive unit was already in said steady-state condition directly ahead of said stalling; said stalling took place absent the input of the operator; and, said force-tight connection between said drive unit and said transmission is interrupted.

2. The method of claim 1, comprising the further steps of:

checking as to whether said drive unit still outputs a torque; and, initiating said restart only if said drive unit is at standstill.

3. The method of claim 1, comprising the further steps of:

additionally checking as to whether the operator input at an input unit requests an operation of said drive unit in said steady-state condition; and, initiating the restart only in this case.

4. The method of claim 1, comprising the further steps of:

checking whether a clutch element for interrupting the force-tight connection of the drive unit from said transmission is actuated or whether an operator-controlled element is actuated for adjusting a torque of said drive unit or, if said transmission is an automatic transmission, whether a neutral position is set in said automatic transmission of said drive unit; and, initiating the restart only in this case.

5. The method of claim 4, comprising the further steps of:

determining the departure of the stalling of said drive unit from the operator input in dependence upon the course of an rpm of said drive unit; and, determining the actuation of said clutch element or of said operator-controlled element.

6. The method of claim 4, comprising the further step of automatically interrupting said force-tight connection between said drive unit and said transmission in the situation wherein said stall of said drive unit takes place in departure from the operator input.

7. An arrangement for automatically restarting a drive unit including an internal combustion engine of a motor vehicle, the arrangement comprising:

first detecting means for detecting a steady-state condition after an initialization of said drive unit;

input detecting means for detecting an input of an operating state of said drive unit;

second detecting means for detecting a force-tight connection between said drive unit and a transmission; and, control means for automatically initiating a restart of said drive unit after a stall of said drive unit when: said first detecting means detects said steady-state condition for said drive unit directly in advance of the stall; the stall of said drive unit took place in opposition to an operator input at an input unit; and, said second detecting means detects said transmission separated from said drive unit.

8. The arrangement of claim 7, further comprising:

third detecting means for detecting a torque of said drive unit; and, said control unit functioning to initiate the restart only at standstill of said drive unit.

9. The arrangement of claim 7, wherein said control unit functions to initiate the restart only when the operator input at the input unit requests an operation of said drive unit in said steady-state condition.

10. The arrangement of claim 7, further comprising:

sixth detecting means for detecting a setting of a neutral position in said transmission, if maid transmission is an automatic transmission; and.

said control means functioning to initiate the restart only when said sixth detecting means detects a setting of a neutral position in said automatic transmission.

11. The arrangement of claim 7, further comprising:

fourth detecting means for detecting an actuation of a clutch element for interrupting the force-tight connection of said drive unit from the transmission; and, said control means functioning to initiate the restart only when said fourth detecting means detects an actuation of said clutch element.

12. The arrangement of claim 11, further comprising:

fifth detecting means for detecting the actuation of an operator-controlled element for adjusting a torque of said drive unit; and, said control means functioning to initiate the restart only when said fifth detecting means detects an actuation of said operator-controlled element.

13. The arrangement of claim 12, further comprising:

seventh detecting means for detecting a course of rpm of said drive unit; and, said control means functioning to determine the departure of the stall of said drive unit from the operator input in dependence upon said course of the rpm of said drive unit and said actuation of said clutch element or said actuation of said operator-controlled element.

14. The arrangement of claim 12, further comprising separation means for automatically interrupting said force-tight connection between said drive unit and said transmission for the situation wherein stalling of said drive unit takes place in departure from the operator input at said input unit.

* * * * *

UNITED STATES PATENT AND TRADEMARK OFFICE
CERTIFICATE OF CORRECTION

PATENT NO.    : 6,881,172 B2
DATED         : April 19, 2005
INVENTOR(S)   : Holger Huelser, Frank Bickendorf and Thorsten Juenemann It is certified that error appears in the above-identified patent and that said Letters Patent is hereby corrected as shown below:

Column 11,
Line 3, delete "maid" and insert -- said -- therefor.

Signed and Sealed this

Fourteenth Day of June, 2005

JON W. DUDAS
*Director of the United States Patent and Trademark Office*